(No Model.)

F. SHUMAN.
PROCESS OF CUTTING WIRE EMBEDDED GLASS.

No. 531,874. Patented Jan. 1, 1895.

Witnesses:
B. Schleicher
Chas. DeLow.

Inventor:
Frank Shuman
By his Attorneys
Howson & Howson

UNITED STATES PATENT OFFICE.

FRANK SHUMAN, OF PHILADELPHIA, PENNSYLVANIA.

PROCESS OF CUTTING WIRE-EMBEDDED GLASS.

SPECIFICATION forming part of Letters Patent No. 531,874, dated January 1, 1895.

Application filed July 5, 1894. Serial No. 516,575. (No specimens.)

*To all whom it may concern:*

Be it known that I, FRANK SHUMAN, a citizen of the United States, residing in Philadelphia, Pennsylvania, have invented a certain Process of Cutting Wire-Embedded Glass, of which the following is a specification.

The object of my invention is to cut sheets of wire embedded glass to any size desired. This object I attain in the following manner, reference being had to the accompanying drawings, in which—

Figure 1:
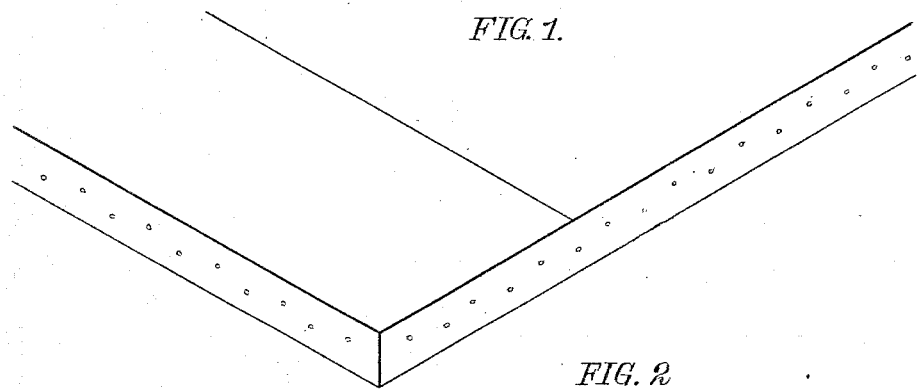
Figure 2:
Figure 3:
Figure 4:
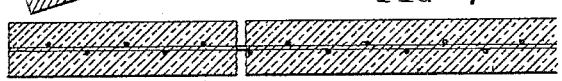
Figure 5:
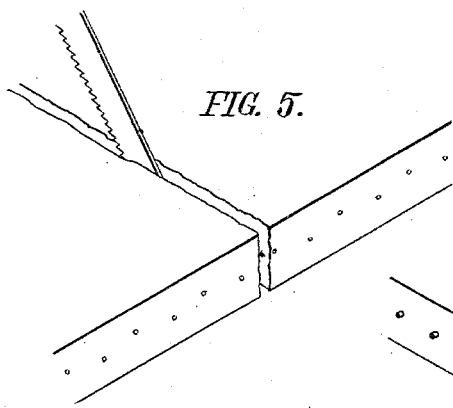
Figure 6:
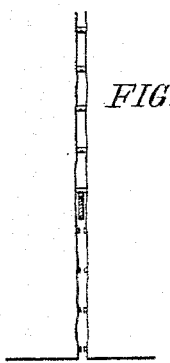
Figure 7:
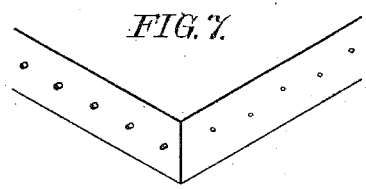

Figure 1, is a perspective view illustrating the first step of my process. Figs. 2, 3 and 4, are sectional views illustrating different steps of the process. Fig. 5, is a perspective view illustrating the last step of the process. Fig. 6, is a plan view showing the partly severed glass. Fig. 7, is a perspective view illustrating a sheet of glass cut in accordance with my invention.

It is impossible to cut wire embedded glass in the ordinary manner without destroying one of the severed pieces. If the glass is cut with a diamond and cracked it is impossible to separate one piece from the other owing to the wire embedded therein and it is this feature of the glass that makes it valuable as a sky-light or roof glass as cracks will not open sufficiently to allow water or air to pass through and the glass will remain intact. By my invention, however, the glass can be cut to any size desired, and can be readily shaped as desired.

In carrying out my process I first cut the glass on a predetermined line, as shown in Fig. 1, with a diamond or equivalent tool. Then I crack the glass on this line in the ordinary manner of cracking large sheets of glass, preferably by tapping with a hammer on the under side of the sheet, which leaves the sheet, as shown in Fig. 2, with a crack entirely through the glass, but the two pieces of glass are united by the embedded wire. I bend the sheet, as shown in Fig. 3, using one edge of each section as a fulcrum, drawing out or expanding the wire between the two sections of the glass. This may be repeated by bending in the opposite direction, as shown by dotted lines in Fig. 3, if necessary, using the opposite edges of the glass as a fulcrum, thus increasing the space at the end by drawing out the wire and when the sections of glass have been separated sufficiently as shown in Fig. 4, I use a fine saw or knife, preferably made very narrow, as shown in Fig. 5, and by passing the saw or knife over the exposed wire they are severed.

In very thick glass it is almost impossible to make a straight break. Consequently I prefer to use a narrow saw or knife, as shown in Fig. 5, so that it will accommodate itself to the irregularities of the crack.

By this method the glass is readily severed at the point desired without the liability of particles of the glass cracking away and without the liability of making a defective sheet.

Prior to my invention wire glass was made according to the size of the wire embedded in the glass and the superfluous glass was cut away from the wire embedded glass, but by my invention large sheets can be made and sections of any desired length can be readily cut from the main section.

The wire can be severed when the sheets of glass are in the position shown in Fig. 4, or where one sheet is turned down and the wire bent as shown in Fig. 3.

The wire in some instances may be partly severed by the saw or knife and then bent backward and forward until broken.

I claim as my invention—

1. The process herein described of cutting wire embedded glass, said process consisting in first cracking the glass on the desired line, drawing the wire between the two sections of glass so as to leave a space of the desired width, then severing the exposed wires, substantially as described.

2. The process herein described of cutting wire embedded glass, said process consisting in first scratching the glass on the desired line with a diamond or its equivalent, cracking the glass on the desired line, bending one section in respect to the other using the edges of the glass as a fulcrum so as to draw the wire between the sections until a space of the desired width is attained, then severing the wire with a narrow bladed saw or knife, substantially as described.

In testimony whereof I have signed my name to this specification in the presence of two subscribing witnesses.

FRANK SHUMAN.

Witnesses:
EDWIN C. FREEMAN,
WILLIAM A. BARR.